United States Patent

Appelo

[15] 3,707,659
[45] Dec. 26, 1972

[54] CHOPPER CONTROL APPARATUS HAVING A COMMON CONTROL PATH

[72] Inventor: Hendrik C. Appelo, Geneva, Switzerland

[73] Assignee: Westinghouse Electric Corporation, Pittsburgh, Pa.

[22] Filed: June 9, 1971

[21] Appl. No.: 151,440

[52] U.S. Cl. ............... 318/52, 318/85, 318/231, 307/32, 321/27
[51] Int. Cl. ............................................. H02p 5/46
[58] Field of Search ............ 318/52, 85, 231; 307/32; 321/27

[56] References Cited

UNITED STATES PATENTS

| | | |
|---|---|---|
| 3,447,050 | 5/1969 | Geis.................................321/27 X |
| 3,439,242 | 4/1969 | Gasser..............................321/27 X |
| 3,178,624 | 4/1965 | Borden.............................318/231 X |
| 3,596,154 | 9/1971 | Gurwicz................................318/52 |

*Primary Examiner*—Gene Z. Rubinson
*Attorney*—F. H. Henson, R. G. Brodahl and J. M. Arnold

[57] ABSTRACT

A vehicle includes a plurality of vehicle cars, one vehicle car of which provides a vehicle control signal for use by itself as well as for transmission over a single signal transmission path to the other vehicle cars. In the other vehicle cars the vehicle control signal is delayed a finite amount of time which is determined by the number of vehicle cars. The resultant vehicle control signal present in each vehicle car is used to control the chopper conduction period for the vehicle car. The control of the respective chopper conduction periods results in a reduction of the ripple current from the power source.

6 Claims, 8 Drawing Figures

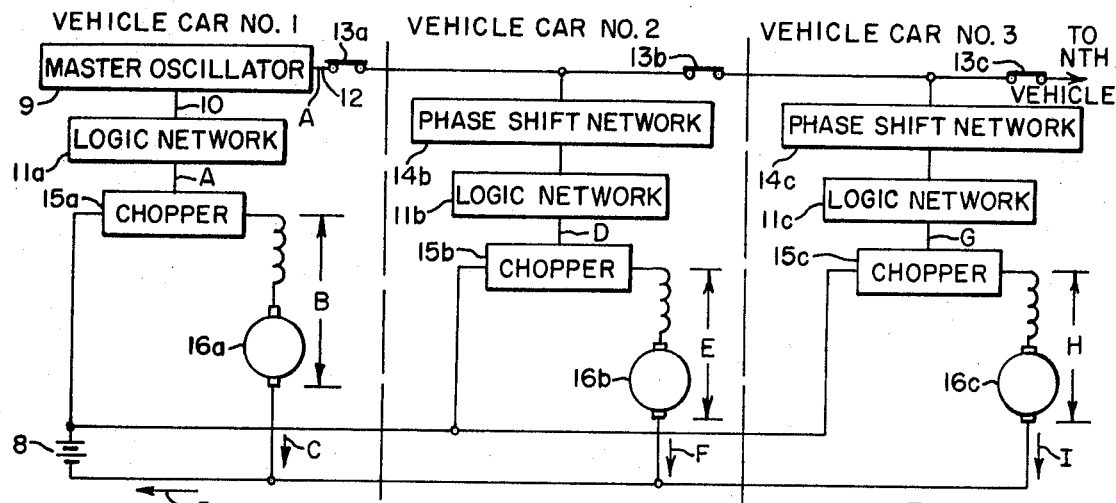
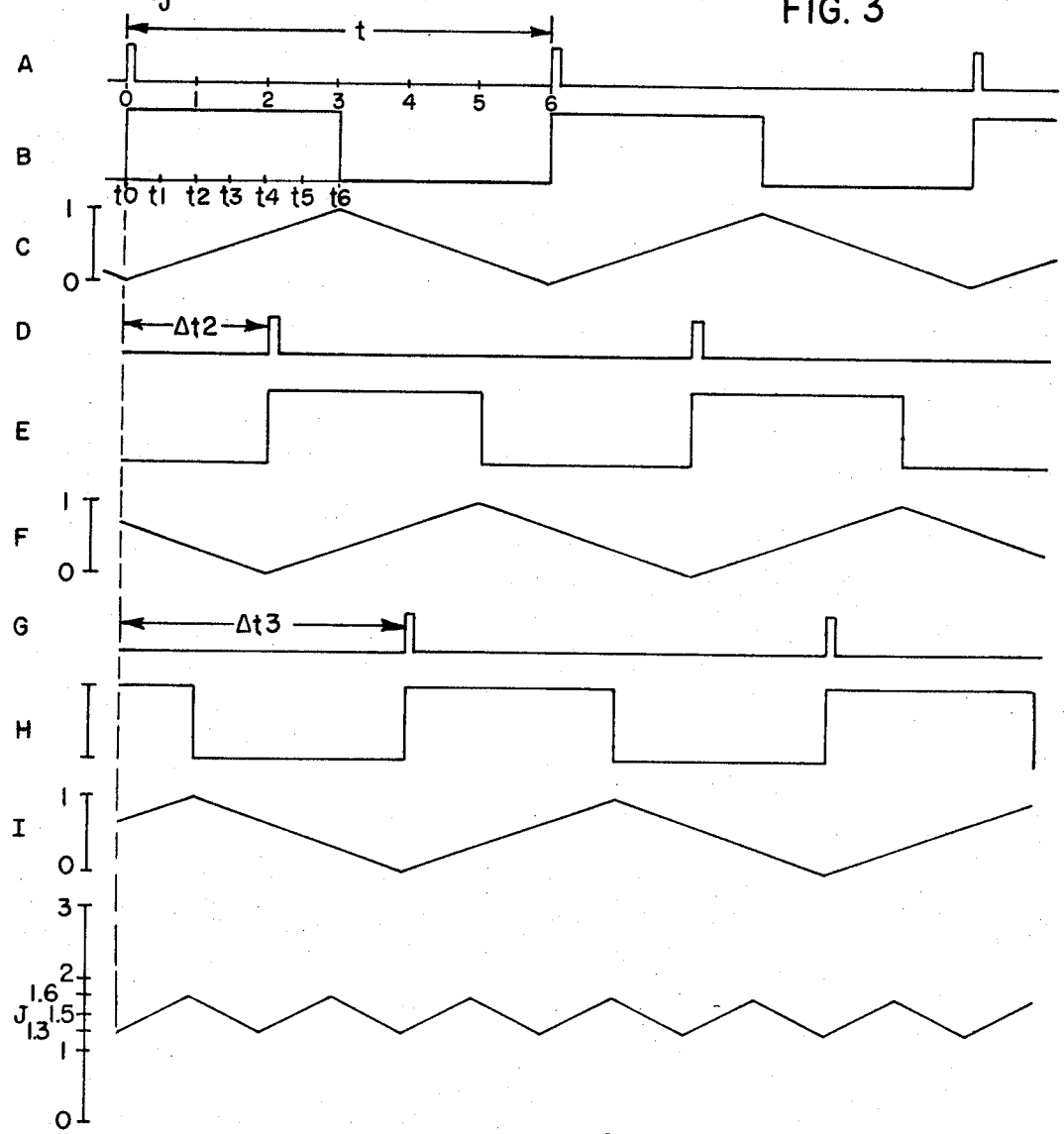
FIG. 4

3,707,659

CHOPPER CONTROL APPARATUS HAVING A COMMON CONTROL PATH

CROSS REFERENCE TO RELATED APPLICATION

This application is related to the copending patent application "Control Of A Vehicle Along A Path Divided Into A Plurality Of Signal Blocks," Ser. No. 762,563, filed Sept. 25, 1968 by Robert C. Hoyler and George M. Thorne-Booth and assigned to the assignee of the present invention.

SUMMARY OF THE INVENTION

In accordance with the teachings of the present invention a vehicle system is described in which a plurality of vehicle cars are operated and each vehicle car includes a chopper which controls the vehicle car drive motor. There are means for providing a control signal to each of the vehicle cars and for delaying the control signal a predetermined amount of time relative to each vehicle car. The delayed control signal present in each vehicle car is applied to the chopper in that vehicle car for controlling the chopper conduction period.

BACKGROUND OF THE INVENTION

It is desired in any vehicle control system to control the chopper conduction period on each vehicle car and to thereby reduce the net line ripple of the propulsion current. In prior art systems where the control of the chopper conduction period was asynchronous the resultant net line ripple of the propulsion currents often times reached undesired levels. Alternatively, if a master oscillator were used to control the chopper on the individual cars, a different signal transmission path from the oscillator to each vehicle car was needed.

The teachings of the present invention provide a system wherein a master oscillator may be used, and a control signal is provided to each of the vehicle cars by way of a single signal transmission path for control of the chopper conduction period in each of the vehicle cars.

DESCRIPTION OF THE DRAWINGS

FIG. 3 is a schematic and block diagram representation of a chopper control circuit embodying the teachings of the present invention;

FIG. 4 is a wave shape relationship diagram helpful in the understanding of the diagram of FIG. 3;

DETAILED DESCRIPTION OF THE PREFERRED EMBODIMENT

Figure 1:
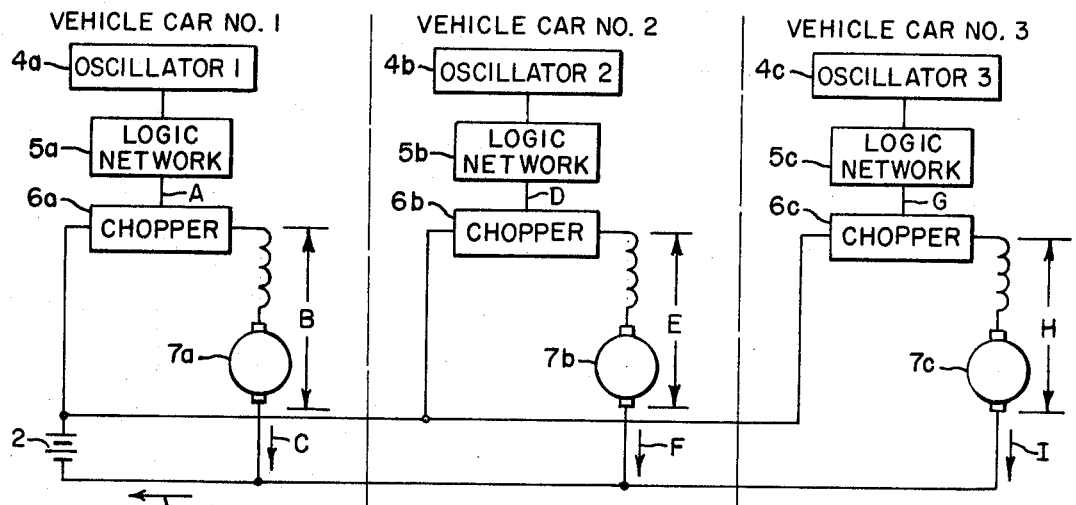
FIG. 1 is a schematic and block diagram representation of a known system for controlling the chopper conduction period.

In FIG. 1 there is illustrated a known block and schematic diagram of the logic elements and circuitry aboard three vehicle cars for controlling the start of the chopper conduction period on the respective vehicle cars. There are like elements included in each of the vehicle cars and like elements are given like numeral designations with the elements in vehicle cars 1, 2 and 3 having the letters a, b and c, respectively, appended thereto. A battery 2 is illustrative of the source of operating potential which supplies propulsion currents to the rails on which the vehicle cars travel. It is appreciated that the diagram shown in FIG. 1 and succeeding Figures are equivalent circuit representations by which the understanding of the system is more easily facilitated. On vehicle car 1 there is an oscillator 4a which supplies one of a sinusoidal wave or a periodic pulse waveform to a logic network 5a which operates upon the output signal from the oscillator 4a to provide clock or control pulses to a chopper 6a. The chopper may be one of many which are known in the art for controlling the operation of a vehicle drive motor such as the vehicle drive motor 7a.

Figure 2:
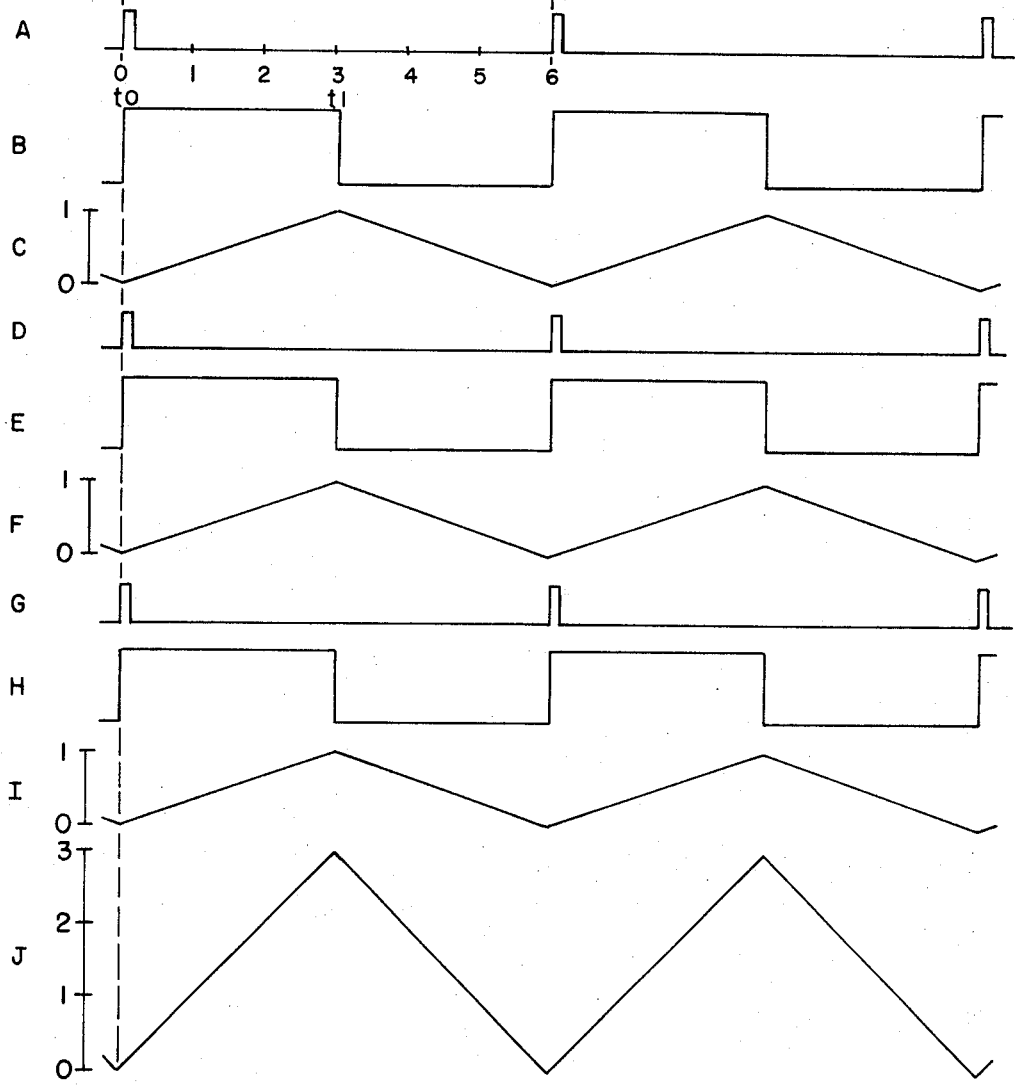
FIG. 2 is a wave shape relationship diagram helpful in the understanding of the diagram of FIG. 1.

The letters a through j shown on FIG. 1 are indicative of the circuit points at which the wave shapes A through J, respectively, of FIG. 2 are present in the block and schematic diagram of FIG. 1. Since the circuitry on board each of the vehicle cars is controlled by an independent oscillator for example the oscillators 4a, 4b and 4c on board the vehicle cars 1, 2 and 3, respectively, the system operation, that is, the control of the individual vehicle drive motors by the choppers is asynchronous. The choppers, therefore, may all be turned on at the same interval of time or they may be turned on at random intervals of time. The result is that the current drain upon the battery 2 is such that there may be high ripple current due to the choppers turning on at substantially the same time interval.

The worst case condition is when the choppers do in fact turn on at the same instance of time. This is more readily seen in reference to FIG. 2 which is a wave shape relationship diagram showing the various voltage and current waveforms present in FIG. 1. The wave shapes A, B and C illustrate the control pulse applied to the chopper, the motor drive voltage, and the motor current respectively for the vehicle car number 1. The wave shapes D, E and F show the same wave shape relationship for the vehicle car number 2, and the wave shapes G, H and I show the same wave shape relationships for the vehicle car number 3. Wave shape J illustrates the total current drawn from the battery 2 due to the turn on of the respective vehicle car drive motors. At a time $t0$ a control pulse from the logic networks 5 are applied to each of the choppers 6 to begin the chopper conduction period (see wave shapes A, D, and G, respectively, FIG. 2). In response to the respective control pulses the choppers 6 apply a voltage wave to the motors 7 with the resultant motor voltage waveforms present on the vehicle cars number 1, 2 and 3 being illustrated by the wave shapes B, E and H, respectively, of FIG. 2. The resultant currents drawn by the vehicle car drive motors in the vehicle cars 1, 2 and 3 is illustrated by the wave shapes C, F and I, respectively of FIG. 2. It is seen that at a time $t1$ each of the motor currents is at its maximum peak, that is, the motor is drawing one unit of current. At this time the total current which is drawn from the battery 2 is three units in magnitude, therefore, in the time interval from $t0$ to $t1$ the current output from the battery 2 had traversed from 0 to three units in magnitude. The currents normally drawn are somewhere on the order of 1,400 amps so it is seen therefore that there has been a large current change or ripple drawn from the source 2. At a time $t2$ the second control pulse is applied to each of the choppers and the chopper conduction period again begins and at a time $t3$ the currents through each of the respective motors is once again at their peak values. It is seen that as the generation of each successive control pulse is applied to the choppers the system operation repeats with a ripple of three units of current. This type of operation is undesirable due to the fact that the battery or power source must have a large current capacity to provide the required current.

In FIG. 3 there is illustrated a schematic and block diagram of logic and circuitry embodying the teachings of the present invention and in which the ripple of the current is reduced substantially as compared to known type circuits. There is a signal means such as a master oscillator included on one of the vehicle cars and this master oscillator provides control pulses for its own use as well as providing control pulses to the other vehicle cars over a single signal transmission path for their use. Each of the other vehicle cars includes a phase shift or delay network for delaying the control pulses a predetermined amount of time before application of the latter pulses to the chopper on board the particular vehicle. It has been found that the optimum point of operation, that is, the lowest net ripple current is achieved when the delay chosen for each vehicle car is equal to an interval of time equal the period $t$ of the control pulses divided by the number $n$ where $n$ is the number of vehicle cars used in the system (delay $= t/n$). For example, if the period $t$ of the control pulses is 6 time units in duration and there are three vehicle cars in operation the delay then equals the period $t$, which is 6, divided by the number $n$, which is 3, with the resultant delay of two units of time per car, that is, the chopper in the vehicle car number 1 is turned on at unit time 0, the chopper in the vehicle car number 2 is turned on two units of time later at unit time 2 and the chopper in the vehicle car number 3 is turned on two units of time later at unit time 4 and two units of time later at unit time 6 the chopper in vehicle car number 1 is once again turned on and the cycle repeats itself.

Like logic elements in vehicle cars number 1, 2 and 3 are given like numeral designations with the elements in vehicle cars number 1, 2 and 3 having appended thereto the letters $a$, $b$ and $c$, respectively. A battery 8 supplies propulsion currents to the rails and in turn to the choppers and vehicle drive motors in the respective vehicle cars. A signal means such as a master oscillator 9 provides a control signal by way of a line 10 to a logic network 11a in vehicle car number 1, the same signal is applied via a single signal transmission path such as the conductor or train line 12 to the remaining vehicle cars. The train line 12 is coupled between the vehicle cars by coupler switches 13. The letters a through j shown on FIG. 3 are indicative of the circuit points at which the wave shapes A through J, respectively, of FIG. 4 are present in the circuit of FIG. 3. At a time $t0$ the master oscillator 9 provides a first control pulse to the logic network 11a of vehicle car number 1, and also to the phase shift or delay networks 14 in the vehicle cars 2 and 3. The control pulse at time $t0$ is passed with substantially no time delay by the logic network 11a in vehicle car number 1 and in turn starts the conduction period of the chopper 15a in vehicle car 1. The chopper 15a in turn provides voltage to the vehicle drive motor 16a in vehicle car 1 with the resultant motor voltage as shown by wave shape B, FIG. 4 being generated by the vehicle drive motor 16a. The vehicle drive motor 16a at this time begins to draw current in the positive direction and at this same time the vehicle drive motor 16b in vehicle car number 2 is decreasing in current as shown by wave shape F of FIG. 4, and the vehicle drive current for vehicle drive motor 16c in vehicle car number 3 is increasing in a positive going direction as illustrated by the wave shape I of FIG. 4. The resultant current (see wave shape J of FIG. 4) drawn from the battery 8 at this time is on the order of 1½ units of current. At a time $t1$ the motor current drawn by the vehicle drive motor 16a is increasing in a positive direction and the vehicle drive motor drawn by the vehicle drive motor 16b is decreasing toward zero. The current drawn by the vehicle drive motor 16c is increasing in a positive direction with a resultant total current being drawn from the battery 8 at this time on the order of 1½ units of current, as illustrated by wave shape J of FIG. 4. At a time $t2$ the motor current drawn by the vehicle drive motor 16a continues to increase in a positive going direction as illustrated by wave shape C, FIG. 4 and the motor current drawn by the vehicle drive motor 16b is continuing to decrease as illustrated by wave shape F, of FIG. 4. At this time ($t2$) the vehicle drive motor 16b is drawing the maximum or one unit of current as illustrated by the wave shape I, of FIG. 4. The resultant total current drawn from the battery 8 at this time is on the order of 1⅔ units of current. At a time $t3$ the current from vehicle drive motor 16a continues to increase in a positive direction as illustrated by the wave shape C, of FIG. 4, the current from the vehicle drive motor 16b and is on the order of one-third units of current as shown by wave shape F, of FIG. 4. The vehicle motor drive current drawn by vehicle drive motor 16c is on the order of two-thirds units of current at this time as illustrated by the wave shape I, of FIG. 4. The resultant current drawn from the battery 8 at this time is on the order of 1½ units of current as illustrated by the wave shape J, of FIG. 4.

At a time $t4$ the delayed control signal, which is delayed two units in time as depicted by the time interval $\Delta t2$, is applied via the phase shift or delay network 14b and logic network 11b to the chopper 15b (see wave shape D of FIG. 4) to start the chopper conduction period for the vehicle drive motor 16b. The vehicle drive motor 16a is at this time drawing current on the order of two-thirds units of current as shown by the wave shape C, of FIG. 4. The vehicle drive motor 16b is drawing 0 current at this time as its chopper conduction period is just beginning as illustrated by wave shape F, of FIG. 4. The vehicle drive motor 16c is drawing current on the order of two-thirds units current at this time as illustrated by the wave shape I, of FIG. 4. The resultant total current drawn by the battery 8 at this time is on the order of 1⅓ units of current as illustrated by the wave shape J, of FIG. 4. This illustrates one complete ripple cycle of current through the battery 8 and this cycle is repeated for the following control pulses as applied to the respective choppers. It is seen at a time $t_5$ that the first control pulse which is delayed four units of time and is depicted by the time interval $\Delta t3$ is applied to the phase shift network 14c in vehicle car number 3 (see wave shape G of FIG. 4). It may be seen in referring to wave shape J, of FIG. 4 that this completes the second cycle of ripple current drawn from the battery 8. It is seen that there is a maximum ripple on the order of one-third units of current for the embodiment illustrated, whereas the maximum ripple current which was produced in the prior art embodiment of FIG. 1 was on the order of 3 units of ripple current. It is clear that the embodiment set forth in FIG. 4 has substantially reduced and in fact nearly eliminated all ripple current since the choppers in the respective vehicle cars begin their conduction periods at predetermined times, which results in a reduction of current drawn from the power source.

Figure 5:
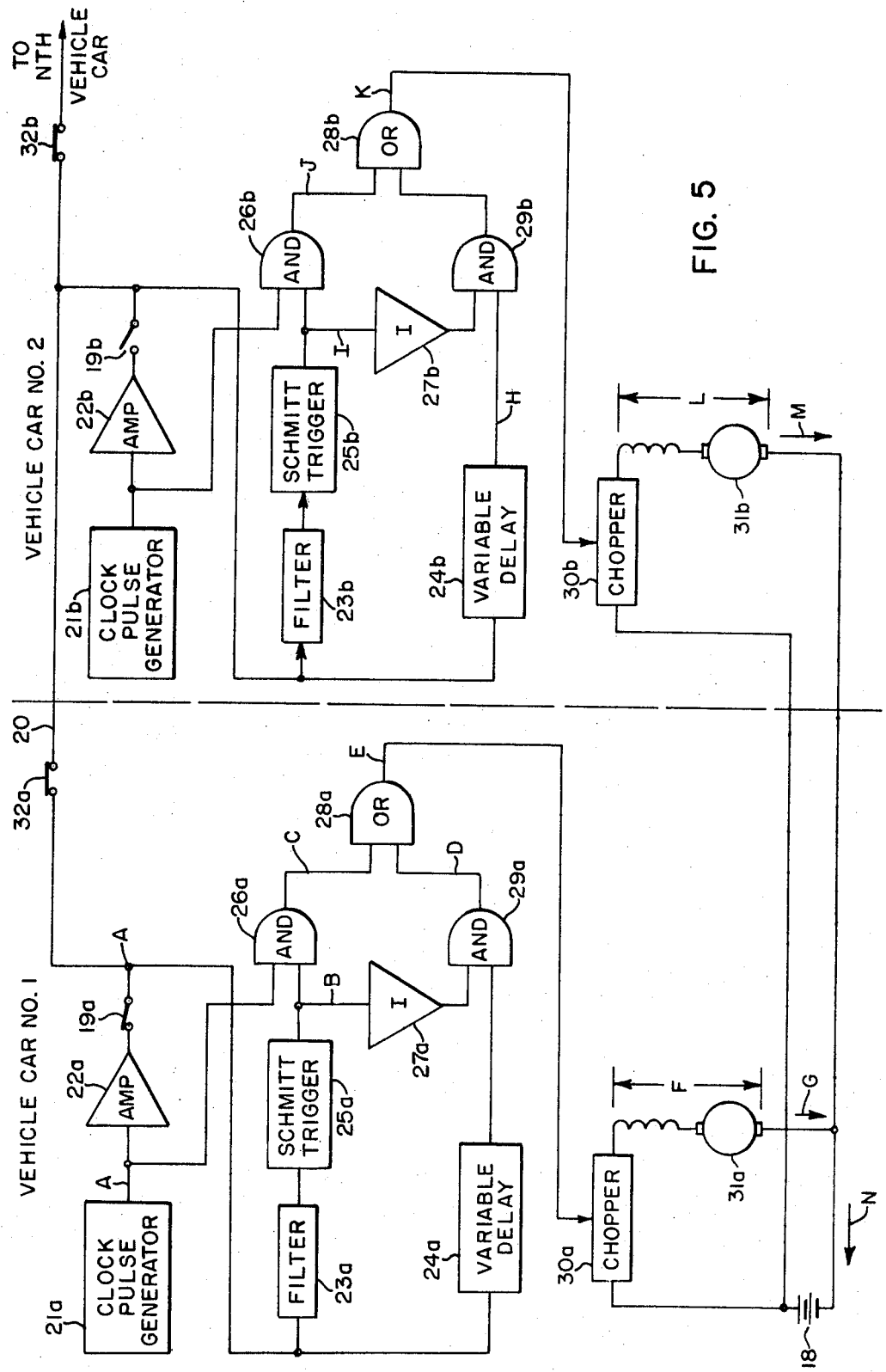
FIG. 5 is a block diagram and schematic illustrating another chopper control circuit embodying the teachings of the present invention.
Figure 6:
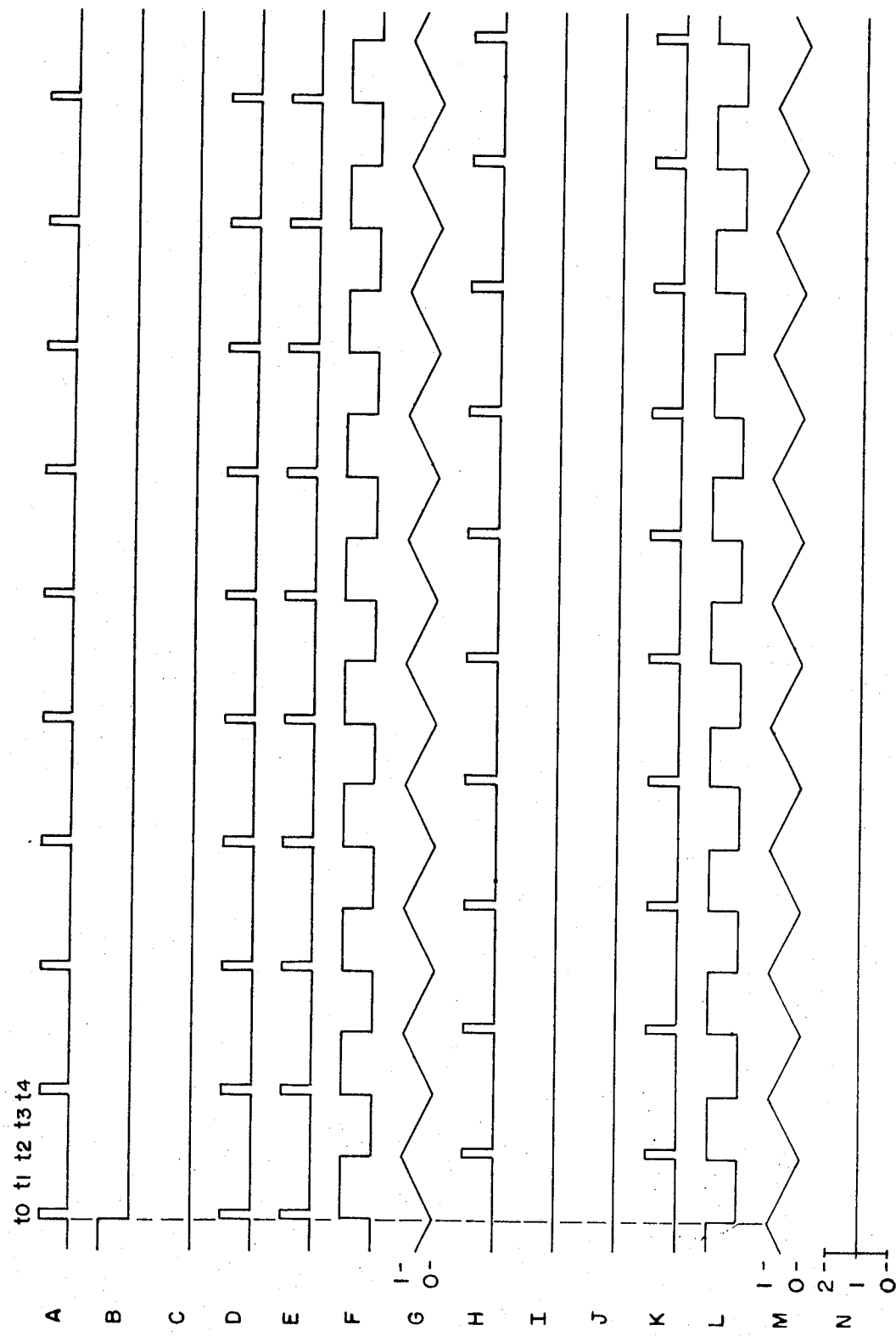
FIG. 6 is a wave shape relationship diagram helpful in the understanding of the diagram of FIG. 5.

FIG. 5 is a schematic and block diagram representation of a chopper control system for a plurality of vehicle cars in which all of the vehicle cars include a signal means such as a clock pulse generator which may be used as the master oscillator for the system. The selection of a predetermined one of the clock pulse generators as the master oscillator is facilitated by a switch means in one of the vehicle cars. A constraint is placed upon the system in that one and only one of the clock pulse generators may provide clock pulses over a single signal transmission path to the other vehicle cars in the system. In FIG. 5 the logic circuitry for two vehicle cars is illustrated with the understanding that N vehicle cars may be used in the system. There are like elements in each vehicle car and the like elements are given like numeral designations with the elements in vehicle car number 1 having the letter a appended thereto and the like elements in vehicle car number 2 have the letter b appended thereto. A battery 18 supplies the operating potential and propulsion currents to the rails over which the vehicle cars travel, which in turn is applied to the chopper and the vehicle drive motors in each vehicle car. The chopper conduction period is controlled by logic circuitry similar to that explained in conjunction with FIG. 3. The letters a through n which are found on FIG. 5 are indicative of the circuit points at which the wave shapes A through N respectively as seen in FIG. 6 are present in the circuitry of FIG. 5. The switches 19a and 19b which are in the vehicle cars 1 and 2, respectively, select whether or not that particular vehicle car is to provide the master clock pulses for use by the other vehicle cars in the system. As was previously mentioned a constraint is placed on the system such that only one of the switches 19 may be closed so that one and only one vehicle car provides the master clock pulses over the single signal transmission path such as the conductor or train line 20 to the other vehicle cars in the system. For example, in the system shown the vehicle car number 1 is the car chosen to provide master clock pulses to the other vehicle car. Therefore, the switch 19a in vehicle car number 1 is closed whereas the switch 19b in the vehicle car number 2 is opened as are the switches 19 in the remaining vehicle cars (not shown).

If the switch 19 in all of the vehicle cars are in an open condition then each individual vehicle car provides control pulses to their respective choppers by way of the clock pulse generator situated in the individual vehicle car. For example, consider that all of the switches 19 are in the open condition. It follows that there are no clock pulses then present on the single signal transmission path 20. The clock pulse generator 21a in vehicle car number 1 provides clock pulses to the amplifier 22a and these clock pulses are applied to the input terminal of the open switch 19a. Since the switch 19a is in an open condition, there are no clock pulses provided to the single signal transmission path 20 by way of the clock pulse generator 21a. Therefore, there is no signal input to the filter 23a or the variable delay network 24a. The filter 23a has its output connected to the input of a Schmitt trigger circuit 25a. In the absence of an input signal to the Schmitt trigger 25a there is a signal indicative of a binary 1 provided at the output of the Schmitt trigger 25a which is applied to a first input of an AND gate 26a and to the input of an inverter 27a. The AND gate 26a is enabled by this binary 1 signal and therefore passes the clock pulses applied to its second input terminal from the clock pulse generator 21a to a first input of an OR gate 28a. The second input of the OR gate 28a is from an AND gate 29a which is disabled at this time due to the binary zero signal applied to its first input terminal from the inverter 27a. The second input to the AND gate 29a is from the variable delay network 24a which is providing no output at this time due to the open condition of the switches 19 in each of the vehicle cars. The resultant clock pulses at the output of the OR gate 28a due to the clock pulses provided thereto from the AND gate 26 a are applied to a chopper network 30a which in turn controls the on times of the vehicle drive motor 31a in vehicle car number 1. Since the switches 19 in the remaining vehicle cars are in the open condition, they each block application of clock pulses to the signal transmission path 20, and the logic circuitry in each of the remaining vehicle cars operates in a manner similar to that explained for vehicle car number 1 as the logic circuitry is identical in each vehicle car.

Consider now the instance in which vehicle car number 1 is chosen to provide master clock pulses through the closed switch 19a, the coupler switch 32a and the coupler switch 32b to the other vehicle cars in the system. For purpose of description it is to be assumed that only two such vehicle cars are used in the system namely vehicle car number 1 and vehicle car number 2. The clock pulses from the generator 21a (see wave shape A of FIG. 6) are provided to the single signal transmission path 20 by way of the amplifier 22a and the closed switch 19a and are also applied directly to the first input of the AND gate 26a. The clock pulses on the single signal transmission path 20 are coupled to the filter 23a and the variable delay network 24a which has a predetermined delay of zero set as the vehicle car number 1 is the master clock pulse generator. The filter 23a charges to a predetermined voltage level in response to the provided clock pulses, and in turn triggers the Schmitt trigger such that a binary zero signal appears at its output in response to the first clock pulse provided and each of the successive clock pulses (see wave shape B of FIG. 6). The binary zero signal at the output of the Schmitt trigger disables the AND gate 26a and therefore blocks the clock pulses provided to its first input terminal from the generator 21a. The inverter 27a, however, in response to the binary zero signal at its input provides a binary 1 signal at its output enabling the AND gate 29a to pass the clock pulses provided at its second input from the variable delay network 24a (see wave shape D of FIG. 6). The OR gate 28a in turn passes the clock pulses to the input of the chopper network 30a (see wave shape E of FIG. 6). In response to the first clock pulse at the time $t0$ (see FIG. 6), the chopper provides a motor control voltage as shown by wave shape F of FIG. 6 and the vehicle drive motor 31a begins to draw current as shown by wave shape G of FIG. 6. In response to each of the successive clock pulses applied to the chopper 30a the chopper conduction period begins and the vehicle drive motor 31a draws current as illustrated.

In vehicle car number 2 the filter 23b charges to a predetermined voltage level sufficient to trigger the Schmitt trigger 25b in response to each of the clock pulses provided over the transmission path 20 such that the Schmitt trigger provides a binary zero signal at its output (see wave shape I of FIG. 6). This latter binary zero signal level disables the AND gate 26b which blocks the provision of clock pulses from the generator 21b to the OR gate 28b. The inverter 27b in response to the binary zero signal level at its input provides a binary 1 signal level to the first input of the AND gate 29b and the AND gate 29b in response to the latter binary 1 signal level passes the first control pulse which is delayed until a time $t1$ by the variable delay network 24b (see wave shape H of FIG. 6). As was stated earlier it is assumed that only vehicle car number 1 and vehicle car number 2 are operative in the system, therefore with a clock pulse period of four time units as shown the variable delay network is set to have a delay of two units in time to provide maximum efficiency of the chopper control period (delay = $t/n$). The delayed clock pulse at time $t1$ is passed by the AND gate 29b and in turn by the OR gate 28b (see wave shape K of FIG. 6) to start the chopper conduction period of the chopper 30b. The vehicle drive motor 31b also begins to draw current at this time (see wave shape M of FIG. 2).

The total ripple current drawn from the battery 18 may now be calculated. It is seen that at time $t0$ vehicle drive motor 31a in car number 1 is drawing zero units of current (see wave shape G of FIG. 6), and vehicle drive motor 31b in car number 2 is drawing one unit of current (see wave shape M of FIG. 6). The resultant total current drawn from the battery 18 at time $t0$, therefore, is the sum of these two currents which is one unit of current. At the time $t1$ the vehicle drive motor 31a is drawing one unit of current (see wave shape G of FIG. 6) and the vehicle drive motor 31b is drawing zero units of current (see wave shape M of FIG. 6). The resultant current drawn by the battery 18 is again one unit of current (see wave shape N of FIG. 6). For each successive clock pulse time as shown in FIG. 6 there is substantially one unit of current drawn by the battery 18 with a resultant net ripple of substantially zero being drawn from the battery 18. It is appreciated that as more vehicle cars are added to the system the ripple current through the battery 18 will increase a finite amount.

Figure 7:
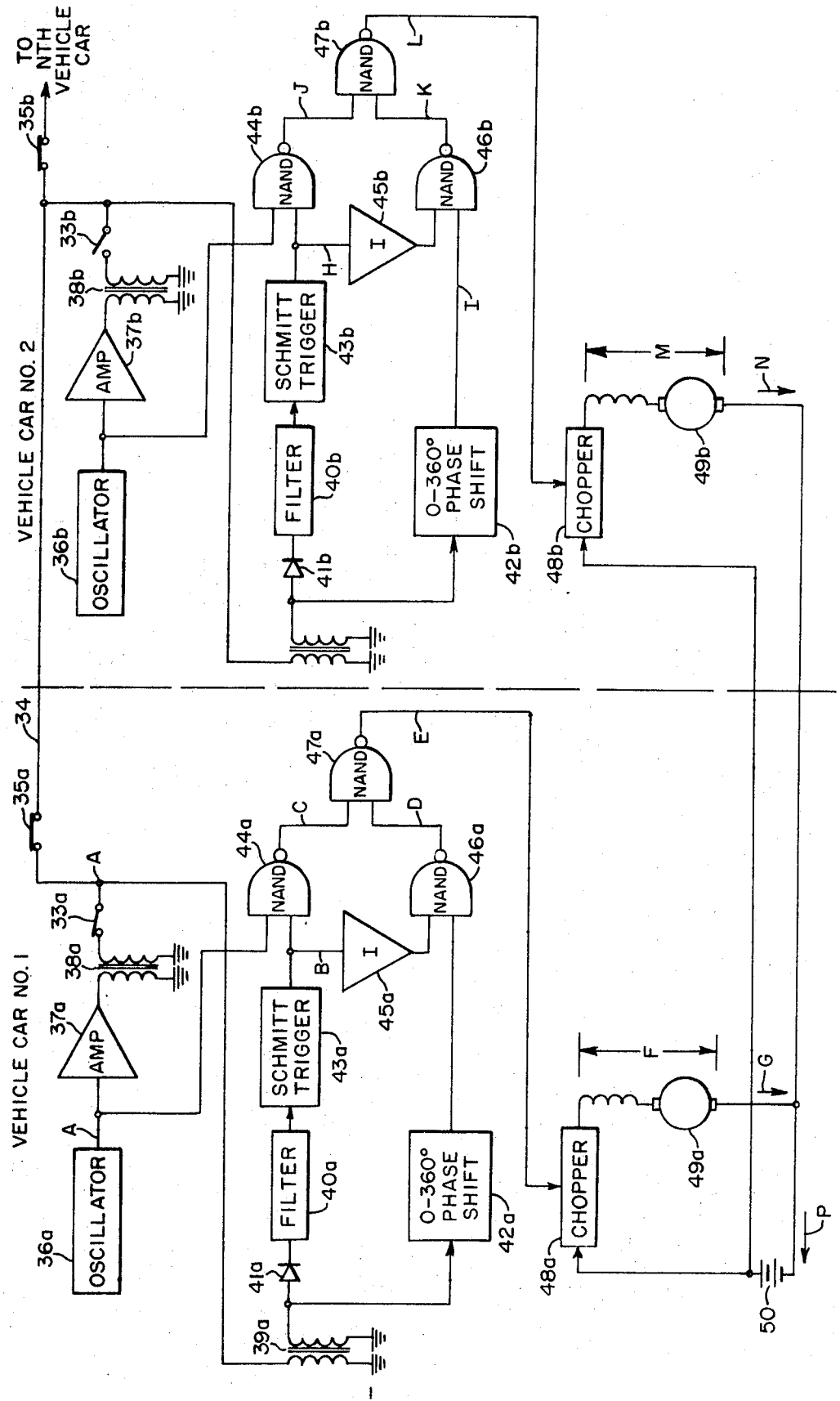
FIG. 7 is a block and schematic diagram illustrating yet another chopper control circuit embodying the teachings of the present invention.
Figure 8:
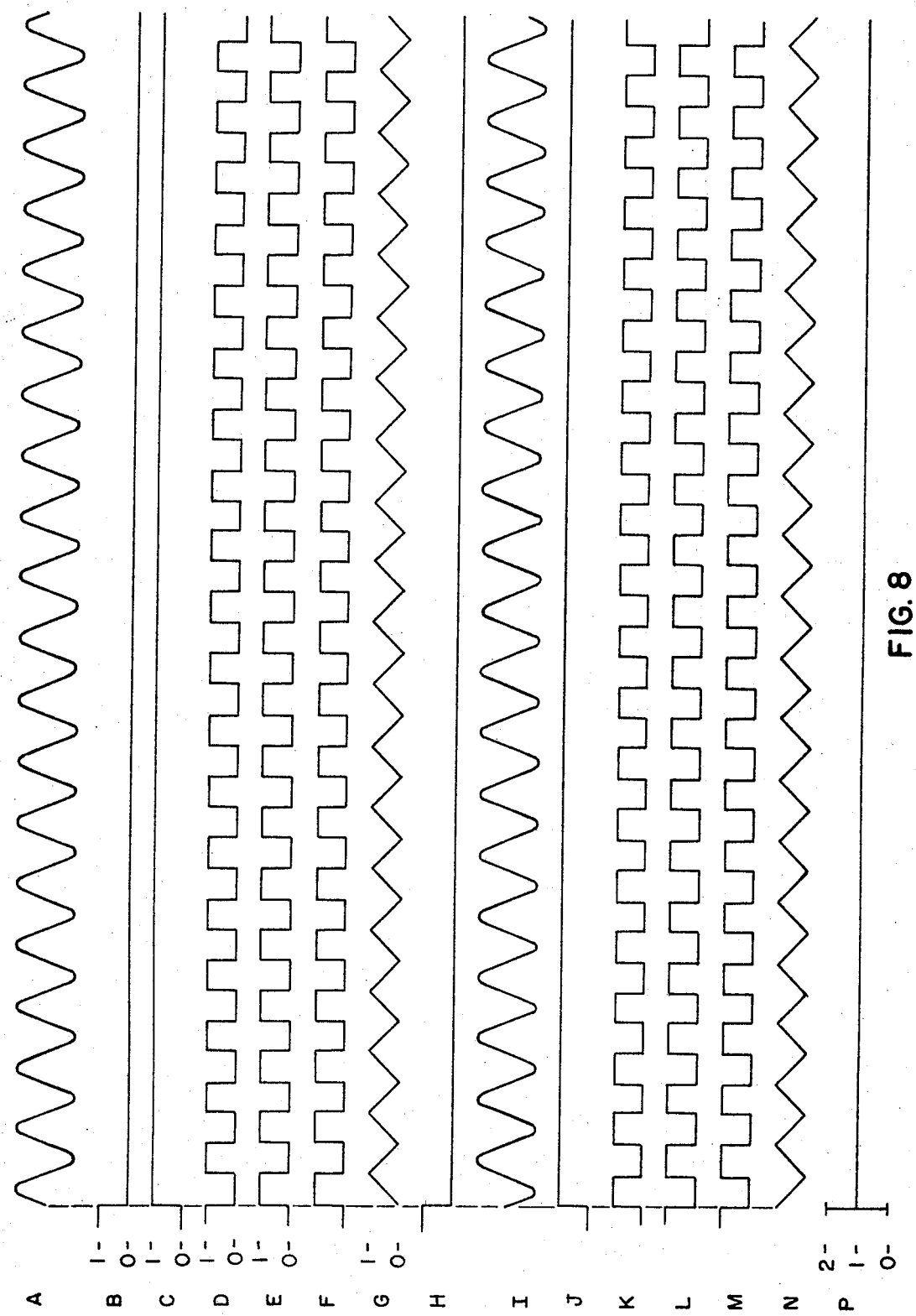
FIG. 8 is a wave shape relationship diagram helpful in the understanding of the diagram in FIG. 7.

In FIG. 7 there is an alternative embodiment illustrated which may be used for the control of the chopper conduction period on the respective vehicle cars, the only difference being that for the embodiment shown the signal means such as the master oscillator provides a sinusoidal output rather than a pulse output as was in the case of the clock pulse generators of FIG. 5. The letters $a$ through $p$ shown on FIG. 7 are indicative of the circuit points at which the wave shapes A through P, respectively, of FIG. 8 are present in the circuit of FIG. 7. Again vehicle car number 1 is chosen to provide the master control pulses to the remaining vehicle cars and therefore a switch 33a in vehicle car number 1 is in a closed position and the switch 33b in vehicle car number 2 is in an open position. The control pulses are provided over a single signal transmission path or conductor such as the train line 34 through the closed coupler switches 35a and 35b. The oscillator 36a provides a sinusoidal output (see wave shape A of FIG. 8) which is amplified by an amplifier 37a and is transformer coupled through a transformer 38a through the close switch 33a to the train line 34. The control signal on line 34 is transformer coupled through a transformer 39a to the input of a filter 40a by way of a detector such as the diode 41a and also to the input of a selective phase shift network 42a. In response to the positive going cycle of the control signal the filter 40a charges to a predetermined voltage level sufficient to make a Schmitt trigger circuit 43a operative such that a binary zero signal level is provided at the output of the Schmitt trigger (see wave shape B of FIG. 8) which in turn enables a NAND gate 44a which provides a binary one signal level at its output (see wave shape C of FIG. 8). The binary zero signal level is inverted by an inverter 45a which provides a binary one signal level to the input of the NAND gate 46a enabling the NAND gate 46a to shape and pass the latter control signal which has a predetermined delay or phase shift of zero from the phase shift network 42a. The NAND gate 46a provides a pulse train at its output (see wave shape D of FIG. 8) which is applied to a first input of a NANd gate 47a which inverts and passes these pulses to a chopper 48a (see wave shape E of FIG. 8).

In response to the positive going edge of each of the control pulses the chopper conduction period for chopper 48a begins and the vehicle drive motor 49a draws current as illustrated by wave shape G of FIG. 8.

The control signal on the train line 34 is coupled via the transformer 39b to the detector 41b and the phase shift network 42b in vehicle car number 2. The filter 40b charges to a predetermined voltage level, in response to the control signal, sufficient to make the Schmitt trigger circuit 43b operative such that a binary zero signal level is provided at the output of the Schmitt trigger circuit (see wave shape H of FIG. 8) which disables the NAND gate 44b such that a binary one signal level is provided at the output of the NAND gate (see wave shape J of FIG. 8). The phase shift network 42b has a phase shift of 180° set such that the wave shape (as shown at I of FIG. 8) is applied to the first input of the NAND gate 46b which has a binary one signal applied to its second input from the inverter 45b. The NAND gate 46b, therefore, provides a shaped and inverted signal at its output (see wave shape K of FIG. 8)

which in turn is provided to the second input of the NAND gate 47b which in turn provides an inverted wave shape at its output (see wave shape L of FIG. 8). This pulse train controls the conduction period of the chopper 48b, which begins its conduction period on the positive going edge of each of the pulses in the provided pulse train. In response to the beginning of each chopper conduction period the vehicle drive motor 49b begins to draw current as illustrated by the wave shape N of FIG. 8. The battery 50 provides a resultant ripple current in response to the conduction of the vehicle drive motors 49a and 49b. For example, at a time $t1$ the vehicle drive motor 49a is drawing zero units of current (see wave shape G of FIG. 8) and the vehicle drive motor 49b is drawing one unit of current (see wave shape N of FIG. 8) with a resultant current of one unit being drawn from the battery 50 (see wave shape P of FIG. 8). At a time $t2$ the vehicle drive motor 49a draws one unit of current (see wave shape G FIG. 8) and the vehicle drive motor 49b draws zero units of current (see wave shape N of FIG. 8) with a resultant current of one unit being drawn from the battery 50 (see wave shape P of FIG. 8). It is seen for each successive control pulse applied to the choppers 48a and 48b that the battery 50 supplies continuously one unit of current with a resultant net ripple of substantially zero magnitude.

In summary a chopper control system has been illustrated in which a master oscillator located in a selected vehicle car provides a control signal to the other vehicle cars over a single signal transmission path with a predetermined delay of the control signal being set in each of the vehicle cars to control the respective chopper conduction periods such that the net resultant ripple current drawn from the power source is substantially reduced.

I claim as my invention

1. In a vehicle control system in which a plurality of vehicle cars are coupled together with a single signal transmission path common to each of said vehicle cars, with each of said vehicle cars including a chopper which controls the vehicle car drive motor, the combination comprising:

signal means for providing a control signal;

switch means for selectively coupling said control signal to said single signal transmission path;

first means for passing said control signal in the event said switch means is one of not coupled to and a second signal is not present on said single signal transmission path;

second means for passing the signal present on said single signal transmission path; and means responsive to one of said first and second means passing a signal, for applying the signal passed to said chopper for controlling the chopper conduction period.

2. The combination claimed in claim 1, with said second means including means for delaying the signal present on said single signal transmission path.

3. The combination claimed in claim 2, wherein the amount of time the signal present on the single signal transmission path is delayed is determined by the number of vehicle cars.

4. The combination claimed in claim 1, with said second means including means for shifting the phase of the signal present on said single signal transmission path.

5. In a vehicle control system in which a plurality of vehicle cars have a common signal transmission path, and each of said vehicle cars includes a chopper which controls the vehicle car drive motor, the combination comprising:

signal means for providing a control signal;

means for selectively coupling said control signal to said common signal transmission path;

first means for passing said control signal in the event said control signal is not coupled to said common signal transmission path;

second means for passing a signal present on said common signal transmission path; and means responsive to either one of said first or second means passing a signal, for applying the signal passed to said chopper for controlling the chopper conduction period.

6. The combination claimed in claim 5, wherein said second means includes means for delaying the signal present on said common signal transmission path.

* * * * *